United States Patent [19]

Ohmae et al.

[11] Patent Number: 5,373,055
[45] Date of Patent: Dec. 13, 1994

[54] METHOD FOR PRODUCING THERMOPLASTIC ELASTOMER COMPOSITIONS

[75] Inventors: Tadayuki Ohmae; Yoshiki Toyoshima; Kentaro Mashita; Noboru Yamaguchi, all of Chiba; Jinsho Nambu, Tokyo, all of Japan

[73] Assignee: Sumitomo Chemical Company, Limited, Osaka, Japan

[21] Appl. No.: 218,885

[22] Filed: Mar. 28, 1994

Related U.S. Application Data

[63] Continuation of Ser. No. 956,470, Oct. 2, 1992, abandoned, which is a continuation of Ser. No. 527,356, May 23, 1990, abandoned.

[30] Foreign Application Priority Data

May 23, 1989 [JP] Japan .................................. 1-130356

[51] Int. Cl.$^5$ .............................................. C08L 37/00
[52] U.S. Cl. ...................................... 525/64; 525/166; 525/176
[58] Field of Search ........................... 525/64, 166, 176

[56] References Cited

U.S. PATENT DOCUMENTS

| | | |
|---|---|---|
| 4,327,199 | 4/1982 | Coran et al. . |
| 4,956,501 | 9/1990 | Sunseri ............................. 525/64 |
| 5,008,337 | 4/1991 | Patel . |

FOREIGN PATENT DOCUMENTS

| | | |
|---|---|---|
| 211649 | 2/1987 | European Pat. Off. . |
| 0285256 | 10/1988 | European Pat. Off. . |
| 285256 | 10/1988 | European Pat. Off. . |
| 337976 | 10/1989 | European Pat. Off. . |
| 0341731 | 11/1989 | European Pat. Off. . |
| 46-32866 | 9/1971 | Japan . |
| 4632866 | 9/1971 | Japan . |
| 55-137154 | 10/1980 | Japan . |
| 1208585 | 10/1970 | United Kingdom . |
| 8803543 | 5/1988 | WIPO . |
| 88035435 | 5/1988 | WIPO . |

*Primary Examiner*—Patricia A. Short
*Attorney, Agent, or Firm*—Cushman, Darby & Cushman

[57] ABSTRACT

A thermoplastic elastomer composition which is excellent in balance of properties such as mechanical properties and thermal properties and in appearance is prepared by melt-kneading (A) 20–58 parts by weight of a saturated polyester resin and (B) 42–80 parts by weight of an epoxy group-containing ethylene copolymer and then melt-kneading 100 parts by weight of the resulting composition with (C) 0.01–20 parts by weight of a polyfunctional compound containing in one molecule at least two functional groups selected from an amino group, a carboxylic acid anhydride group, a hydroxyl group and a

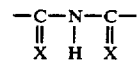

group wherein both X and Y are oxygen atoms or sulfur atoms, or either X or Y is an oxygen atom and another is a sulfur atom, or (D) 0.01–9 parts by weight of a polyfunctional compound having in one molecule at least two carboxyl groups or both at least one carboxyl group and at least one functional group selected from an amino group, a carboxylic acid anhydride group, a hydroxyl group and the

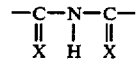

group wherein X and Y are defined above.

4 Claims, No Drawings

METHOD FOR PRODUCING THERMOPLASTIC ELASTOMER COMPOSITIONS

This is a continuation of application Ser. No. 07/956,470, filed Oct. 2, 1992, which was abandoned upon the filing hereof which is a Rule 62 continuation of Ser. No. 07/527,356 filed May 23, 1990, now abandoned.

BACKGROUND OF THE INVENTION

The present invention relates to a method for producing a novel thermoplastic elastomer composition which is flexible and tough in a wide range of temperature and is excellent in balance of properties such as mechanical properties and thermal properties and in appearance and can be used for automobile bumpers, sound deadening gears, sports shoes soles, tubes, hoses, and the like.

Hitherto, flexible vinyl chloride resins, ethylene-vinyl acetate resins, thermoplastic urethane resins, nylon 12, polyester elastomers and the like have been generally used as materials which provide hard rubbers or leather-like molded articles. However, flexible vinyl chloride resins halve a problem in cold resistance, ethylene-vinyl acetate resins in wear resistance, thermoplastic urethane resins in processability, nylon 12 in cold resistance and polyester elastomers in hydrolysis resistance and thermal aging resistance and these must be improved.

Japanese Patent Kokai No. 61-40355 discloses a method for improving hydrolysis resistance and thermal aging resistance of polyester elastomers by blending block copolymer type polyester elastomers with carboxyl group and/or epoxy group-containing olefin polymers. However, this composition is poor in balance of properties such as stiffness, heat resistance, impact resistance, oil resistance and electric characteristics because the polyester component is block copolymer type elastomers.

Furthermore, Japanese Patent Kokai No. 55-137154 proposes to blend polyalkylene terephthalates, ethylene-glycidyl methacrylate copolymers and a polyfunctional compound selected from epoxy compounds, isocyanate compounds and carboxylic acid anhydrides.

Moreover, Japanese Patent Kokai No. 61-221260 teaches to blend thermoplastic polyesters with maleic anhydride grafted ethylene-propylene random copolymers and ethylene-glycidyl methacrylate copolymers. However, the above compositions are not satisfactory yet in balance of stiffness, heat resistance, impact resistance and oil resistance as elastomers because the blending materials, blending ratio and blending method are not proper.

Further, Japanese Patent Kokai No. 63-113056 discloses that a composition improved in compatibility, excellent in impact resistance at low temperature and good in balance with stiffness cain be obtained by melt kneading a saturated polyester resin with a copolymer of an unsaturated epoxy compound and ethylene. The composition is considerably improved in these respects, but a further improvement in balance of low-temperature impact resistance, heat resistance, oil resistance and stiffness is required for industrial use thereof.

SUMMARY OF THE INVENTION

An object of the present invention is to provide a method for producing a thermoplastic elastomer composition which is excellent in cold resistance, especially impact resistance at low temperature in addition to heat resistance, wear resistance and chemical resistance which are characteristics of saturated polyester resins and excellent in balance between rubber elasticity and stiffness.

As a result of intensive research conducted by the inventors on polyester elastomers comprising saturated polyester resins to which are added epoxy group-containing ethylene copolymers, it has been found that elastomers used for preparing various molded articles which are excellent in heat resistance, wear resistance, chemical resistance, and cold resistance, especially impact resistance at low temperature and in the balance between rubber elasticity and stiffness are obtained by blending a specific polyfunctional compound in a specific method.

That is, the present invention relates to a method for producing a thermoplastic elastomer composition which comprises melt-kneading (A) 20–58 parts by weight of saturated polyester resins and (B) 42–80 parts by weight of epoxy group-containing ethylene copolymers and then melt-kneading 100 parts by weight of the resulting composition with (C) 0.01–20 parts by weight of polyfunctional compounds containing, in one molecule, at least two functional groups selected from an amino group, a carboxylic anhydride group, a hydroxyl group and a

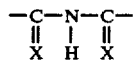

group (wherein both X and Y are oxygen atoms, or sulfur atoms or either X or Y is an oxygen atom and another is a sulfur atom) or (D) 0.01–9 parts by weight of polyfunctional compounds having, in one molecule, at least two carboxyl groups or both at least one carboxyl group and at least one functional group selected from an amino group, a carboxylic anhydride group, a hydroxyl group and the

group (wherein X and Y are as defined above).

DESCRIPTION OF THE INVENTION

The saturated polyester resins (A) used in the present invention comprise a dicarboxylic acid component at least 40 mol% of which is terephthalic acid and a diol component. The dicarboxylic acid component other than the terephthalic acid includes aliphatic dicarboxylic acids of 2–20 carbon atoms such as adipic acid, sebacic acid and dodecanedicarboxylic acid, aromatic dicarboxylic acids such as isophthalic acid and naphthalenedicarboxylic acid and alicylic dicarboxylic acids such as cyclohexanedicarboxylic acid. These may be used singly or as mixtures thereof.

The diol component includes aliphatic and alicyclic glycols such as ethylene glycol, 1,3-propanediol, 1,4-butanediol, 1,6-hexanediol, 1,10-decanediol and 1,4-cyclohexanediol. These may be used singly or as mixtures thereof.

Among these saturated polyester resins (A), especially polybutylene terephthalate or polyethylene terephthalate is desirable. These saturated polyester resins (A) preferably have an intrinsic viscosity of 0.5–3.0 dl/g measured at 25° C. using o-chlorophenol as a solvent.

The desired mechanical strength is not expected with use of saturated polyester resins (A) having an intrinsic viscosity outside the above range.

The epoxy group-containing ethylene copolymers (B) which constitute an elastomeric component of the present invention are copolymers comprising (a) 50-99% by weight of an ethylene unit, (b) 0.1-50% by weight of an α,β-unsaturated carboxylic acid glycidyl ester unit or an unsaturated glycidyl ether unit and (c) 0-50% by weight of an ethylenically unsaturated compound.

The unsaturated glycidyl ester and unsaturated glycidyl ether (b) above in (B) are represented by the following formulas (1) and (2):

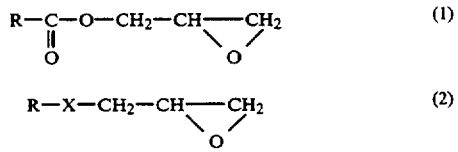

(wherein R is a hydrocarbon group of 2-18 carbon atoms which has an ethylenically unsaturated bond and X is

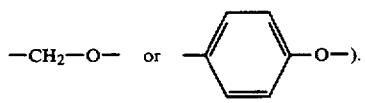

Typical examples of the unsaturated epoxy compounds are glycidyl acrylate, glycidyl methacrylate, glycidyl itaconate, allylglycidyl ether, 2-methylallylglycidyl ether and styrene-p-glycidyl ether.

Furthermore, the epoxy group-containing ethylene copolymers (B) include ter-or more copolymers of unsaturated epoxy compounds, ethylene and ethylenically unsaturated compounds. As the ethylenically unsaturated compounds, mention may be made of α,β-unsaturated carboxylic acid alkyl esters, carboxylic acid vinyl esters, olefins, vinyl ethers and styrenes.

Preferred epoxy group-containing ethylene copolymers (B) are those which comprise 50-99% by weight of an ethylene unit (a), 0.1-50% by weight, preferably 0.5-20% by weight of an α,β-unsaturated carboxylic acid glycidyl ester unit or an unsaturated glycidyl ether unit (b) and 0-50% by weight of an ester unit selected from a carboxylic acid vinyl ester unit and an α,β-unsaturated carboxylic acid alkyl ester unit (c). Preferred are, for example, copolymers comprising an ethylene unit and a glycidyl methacrylate unit, copolymers comprising an ethylene unit, a glycidyl methacrylate unit and a methyl acrylate unit and copolymers comprising an ethylene unit, a glycidyl methacrylate unit and a vinyl acetate unit.

The epoxy group-containing ethylene copolymers (B) have a melt index (JIS K6760) of 0.5-100 g/10 min. If the melt index is more than 100 g/10 min, mechanical properties of the resulting composition are degraded and if it is less than 0.5 g/10 min, the copolymers are not satisfied in compatibility with saturated polyester resin.

The epoxy group-containing ethylene copolymers (B) may be produced by various methods, for example, a random copolymerization method in which the unsaturated epoxy compounds are introduced into the backbone chain of the copolymers or a graft copolymerization method in which the unsaturated epoxy compounds are introduced as a side chain of the copolymers. Some of the embodiments are copolymerizing the unsaturated epoxy compounds and ethylene at 100°-300° C. under 500-4000 atm in the presence of radical forming agents and in the presence or absence of suitable solvents and/or chain transfer agents, or mixing polyethylene with the unsaturated epoxy compounds and radical forming agents and melt-graft copolymerizing the polyethylene with the unsaturated epoxy compounds in extruders.

The polyfunctional compounds (C) used in the present invent ion include those which have in one molecule at least two functional groups selected from an amino group, a carboxylic anhydride group, a hydroxyl group and a

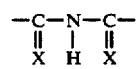

group (wherein X and Y are as defined above ). Alternative polyfunctional compounds (D) used in the present invention include those which have in one molecule at least two carboxyl groups or both at least one carboxyl group and at least one functional group selected from an amino group, a carboxylic anhydride group, a hydroxyl group and a

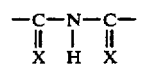

group (wherein X and Y are as defined above). The polyfunctional compounds (C) and (D) have no special limitation in their molecular weight and include polymeric compounds.

Typical examples of the compounds (C) having at least two amino groups in one molecule are as follows:

Aliphatic diamines such as 1,6-hexamethylenediamine, trimethylhexamethylenediamine, 1,4-diaminobutane, 1,3-diaminopropane, ethylenediamine and polyether diamine; aliphatic diamine carbamates such as hexamethylenediamine carbamate and ethylenediamine carbamate; aliphatic polyamines such as diethylenetriamine, triethylenetetramine, tetraethylenepentamine, pentaethylenehexamine, ethylaminoethylamine, methylaminopropylamine, 2-hydroxyethylaminopropylamine, aminoethylethanolamine, 1,3-bis(3-aminopropoxy) -2,2-dimethylpropane, 1,3,6-trisaminomethylhexane, iminobispropylamine, methyliminobispropylamine and bis(hexamethylene) triamine; alicyclic polyamines such as menthanediamine, N-aminoethylpiperazine, 1,3-diaminocyclohexane, isophoronediamine and bis(4-amino-3-methylcyclohexyl)methane; aliphatic polyamines having aromatic ring such as m-xylylenediamine and tetrachloro-p-xylylenediamine; aromatic amines such as m-phenylenediamine, diaminodiphenyl ether, 4,4'-methylenedianiline, diaminodiphenyl sulfone, benzidine, 4,4'-bis(o-toluidine), 4,4'-thiodianiline, o-phenylenediamine, dianisidine, methylenebis(o-chloroaniline), 2,4-toluenediamine, bis(3,4-diaminophenyl) sulfone, diaminoditolyl sulfone, 4-chloro-o-phenylenediamine, 4-methoxy-6-methyl-m-phenylenediamine and m-aminobenzylamine; polyamines containing silicon such as 1,3-bis(γ-aminopropyl) -1,1,3,3-tetramethyldisiloxane; amine-modified silicone oil; butadiene-acrylonitrile copolymers having a terminal functional group of amine; tertiary amine compounds such as N,N,N',N'-tetramethylhexamethylenediamine and N,N,N',N'',N''-pentamethyldiethylenetriamine; ethylene copolymers comprising ethylene unit and α,β-unsaturated carboxylic acid N,N-dialkylaminoalkyl ester unit such as copolymer of ethylene and N,N-dimethylaminoethyl methacrylate; ethylene copolymers comprising ethylene unit and N,N-dialkylaminoalkyl α,β-unsaturated carboxylic acid amide unit such as copolymer of ethylene and N,N-dimethylaminopropylacrylamide; dihydrazide compounds such as succinic acid dihydrazide, adipic acid dihydrazide, isophthalic acid dihydrazide and eicosanediacid dihydrazide; diaminomaleonitrile and melamine. Furthermore, epoxy resin curing agents such as 2,4,6-tris(dimethylaminomethyl)phenol and imidazoles e.g., 2-ethyl-4-methylimidazole may also be used.

Compounds (C) containing at least two carboxylic acid anhydride groups in one molecule include ethylene copolymers comprising ethylene unit and maleic anhydride unit, copolymers of isobutylene and maleic anhydride and copolymers of styrene and maleic anhydride. These copolymers may additionally contain α,β-unsaturated carboxylic acid alkyl esters or carboxylic acid vinyl esters as copolymer component. Examples of such additional components are alkyl esters of acrylic acid or methacrylic acid such as methyl acrylate, ethyl acrylate, butyl acrylate, methyl methacrylate, ethyl methacrylate and butyl methacrylate, vinyl acetate and vinyl propionate. Further examples are trimellitic anhydride, pyromellitic anhydride and ethylene glycol bis-(anhydrotrimellitate).

As compounds (C) having at least two hydroxyl groups in one molecule, mention may be made of saponification products of ethylene-vinyl acetate copolymer, cyanuric acid, phenolic novolak resin and o-cresol novolak resin.

The compounds (C) having at least two

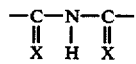

groups (wherein X and Y, are as defined above) in one molecule include heterocyclic compounds, aromatic compounds and aliphatic compounds. As the heterocyclic compounds, mention may be made of, for example, parabanic acid, alloxan, alloxantin, alloxan-5-oxime, barbituric acid, 5,5-diethylbarbituric acid, 5-ethyl-5-phenylbarbituric acid, 5-(1-methylbutyl)-5-allylbarbituric acid, 5,5-diallylbarbituric acid, and isocyanuric acid, and compounds in which the oxygen atom of the

in these compounds is substituted with a sulfur atom such as 2,4-dithiobarbituric acid and 2-thiobarbituric acid. As the aromatic compounds, mention may be made of, for example, pyromellitic acid diimide, mellitic acid triimide, and 1,4,5,8-naphthalic acid diimide and the corresponding thioimides. As the aliphatic compounds, mention may be made of, for example, triuret, 1-methyltriuret, 1,1-diethyltriuret and tetrauret and the corresponding thiourets.

The polyfunctional compounds (D) having two or more carboxyl groups in one molecule are, for example, aliphatic polyvalent carboxylic acids such as oxalic acid, succinic acid, adipic acid, azelaic acid, sebacic acid, dodecanedicarboxylic acid, carbarylic acid, cyclohexanedicarboxylic acid, cyclopentanedicarboxylic acid, ethylene-acrylic acid copolymer, ethylene-methacrylic acid copolymer, ethylene-acrylic acid-methyl acrylate copolymer, ethylene-acrylic acid-ethyl acrylate copolymer, ethylene-acrylic acid-butyl acrylate copolymer, ethylene-acrylic acid-vinyl acetate copolymer, ethylene-methacrylic acid-methyl methacrylate copolymer, ethylene-methacrylic acid-ethyl methacrylate copolymer, ethylene-methacrylic acid-butyl methacrylate copolymer, and ethylene-methacrylic acid-vinyl acetate copolymer, and aromatic polyvalent carboxylic acids such as terephthalic acid, isophthalic acid, o-phthalic acid, naphthalenedicarboxylic acid, biphenyldicarboxylic acid, trimesic acid and trimellitic acid. Aliphatic polyvalent carboxylic acids are especially preferred.

The polyfunctional compounds (D) which have in one molecule both at least one carboxyl group and at least one functional group selected from an amino group, a carboxylic anhydride group, a hydroxyl group and the

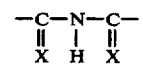

group (wherein X and Y are as defined hereinbefore) are 4-aminobutyric acid, 6-aminohexanoic acid, 12-aminododecanoic acid, 4-hydroxybutyric acid, 6-hydroxyhexanoic acid, 12-hydroxydodecanoic acid, 5-hydroxybarbituric acid, 5-aminobarbituric acid and 5-hydroxyiminobarbituric acid.

The polyfunctional compounds (C) may be used singly or in combination of two or more. So are the polyfunctional compounds (D).

In the thermoplastic elastomer composition of the present invention an amount of the saturated polyester resins, the component (A), is 20–58 parts by weight and that of the epoxy group-containing ethylene copolymers, the component (B), is 42–80 parts by weight. More preferred composition contains 35–58 parts by weight of the polyester resin component (A) and 42–65 parts by weight of the epoxy group-containing ethylene copolymer component (B). If an amount of the saturated polyester component (A) is less than 20 parts by weight, compositions obtained have structures far from the desired one and are inferior in heat resistance and oil resistance. If an amount of the saturated polyester component is more than 58 parts by weight, the compositions obtained are not sufficient in stiffness and cold resistance, especially impact resistance and flexibility at low temperatures.

An amount of the polyfunctional compounds of the component (C) or (D) should be controlled depending on reactivity thereof with the epoxy groups. So far as the polyfunctional compounds (C) having an amino group, a carboxylic anhydride group, a hydroxyl group or a

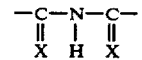

group (wherein X and Y are as defined hereinbefore) are concerned, an amount thereof is 0.01–20 parts by weight every 100 parts by weight of the sum of the saturated polyester resins (A) and the epoxy group-containing ethylene copolymers (B). If an amount of the polyfunctional compounds (C) is less than 0.01 part by weight, an improvement in mechanical properties such as impact resistance is not sufficient enough, while if it is more than 20 parts by weight, not so much improvement is obtained. The component (D), namely, the polyfunctional compounds having a carboxyl group, is added in an amount of 0.01–9 parts by weight every 100 parts by weight of the sum of the components (A) and (B), since reactivity thereof with the epoxy groups is higher than that of the polyfuctional compounds (C). If an amount of the component (D) is less than 0.01 part by weight, mechanical properties of compositions obtained are not sufficient and if it is more than 9 parts by weight, the compositions are too reactive to be processed and the resulting articles are inferior in various properties.

Generally speaking, an increase in impact resistance rather brings about a decrease in stiffness, heat distortion resistance and oil resistance. According to the present invention, stiffness, heat distortion resistance and oil resistance of the composition obtained are increased as well as impact resistance due to the polyfunctional compounds of the component (C) or (D) which are blended in a specific manner. This effect of improvement is beyond expectation.

The thermoplastic elastomer composition of the present invention is prepared by kneading the components in molten state mentioned below.

The method comprises first melt-kneading the saturated polyester resin component (A) and the epoxy group-containing ethylene copolymer component (B) and, then adding to the resulting composition the polyfunctional compound component (C) or (D) and melt-kneading them all to carry out a partial crosslinking reaction. It is assumed that the addition and melt-kneading of the polyfunctional compound component (C) or (D) brings local crosslinking and micro-dispersion of polymers having good properties, with the result that an remarkable improvement in properties is obtained.

The melt-kneading is carried out by kneading apparatuses familiar to the skilled in the art such as single- or twin-screw extruders and other various extruders, Banbury mixer, rolls and various kneaders.

Addition and melt-kneading of the component (C) or (D) of the polyfunctional compounds is performed, for example, in such a manner that the polyfunctional compound component (C) or (D) is added to a composition which has been melt kneaded and granulated and made from the saturated polyester resin component (A) and epoxy group-containing ethylene copolymer component (B) and then melt-kneading the mixture composition in extruders. Preferably, extruders with side feed devices are used where, at the former stage (feeding side), a melt-kneaded composition of the saturated polyester resin component (A) and the epoxy group-containing ethylene copolymer (B) is produced and thereto is added solid or molten polyfunctional compound component (C) or (D), at the latter stage (extrusion side) of the same extruders, through the side feed devices and melt-kneaded. Alternatively, the polyfunctional compound component (C) or (D) and resins which are inert to the component (C) or (D) are previously melt-kneaded to prepare a master-batch a suitable amount of which may be added at any stage in the production of the present thermoplastic resin composition.

Before kneading, the resin components in the form of powder or pellet may be homogeneously mixed by apparatuses such as tumblers or Henschel mixers. If necessary, the components may be separately fed in given amounts to kneading apparatuses without said previous mixing.

The resin composition of the present invention may further contain, as far as its processability and properties are not damaged, other components such as, for example, pigments, dyes, reinforcing agents, fillers, heat stabilizers, antioxidants, weathering agents, nucleating agents, lubricants, antistatic agents, fire retardants, plasticizers and other polymers.

Especially when reinforcing agents or fillers such as surface-treated glass fibers, carbon fibers, talc and calcium carbonate are added to the resin composition of the present invention, materials high in both the stiffness and impact resistance can be obtained.

The kneaded resin composition of the present invention is molded by various methods such as injection molding, extrusion molding and the like.

Modulus in bending (JIS K7203) of the resulting molded articles of resin composition which are obtained by molding the melt kneaded resin composition according to the present invention is preferably 500–15000 $kg/cm^2$.

The object of the present invention is to provide a flexible and tough thermoplastic elastomer which is used for automobile parts such as bumpers, articles for daily use such as sports shoes and work shoes, and mechanical parts such as tubes and hoses and a modulus in bending of 500–5000 $kg/cm^2$ is suitable therefor. If modulus in bending is less than 500 $kg/cm^2$, the molded articles are too soft and are not suitable for the uses aimed at by the present invention and if it is more than 15000 $kg/cm^2$, stiffness is too high and such articles are also not suitable for the uses.

The following nonlimiting examples will explain the present invention.

Properties referred to in the examples were measured in the following manners;.

Heat distortion resistance (heat sag): Sample was held by cantilever and left to stand in a hot-air oven of 100° C. for 2 hours and deflection in this case was measured. (Shape of the sample: 100×20×2 mm thick).

Modulus in bending: JIS K7203 (thickness of sample: 2 mm)

Tensile strength at break and tensile elongation at break: JIS K6301 (thickness of sample: 2 mm)

Izod impact strength: JIS K7110 (thickness of sample: 4 mm; measuring temperature: −20° C.; with V-notch). NB is at least 50 kg cm/cm and this means that the test specimen was not broken.

Melt index: JIS K6760 (190° C., 2160 g)

Oil resistance: JIS K6301 (The sample was dipped in lubricating oil No. 3 at 70° C. for 22 hours and increment of weight was measured.).

In examples and comparative examples, the following were used as saturated polyester resins (A), epoxy group-containing ethylene copolymers (B) and polyfunctional compounds (C) and (D).

(A) Saturated polyester resins:
(1) Polybutylene terephthalate (PBT)
PBT (1) 1401-X06 (Toray Industries, Inc.)
PBT (2) JULANEX 200FP (Polyplastics Co.)
(2) Polyethylene terephthalate (PET) MA-1204 (Unitika, Ltd.)
(B) Epoxy group-containing ethylene copolymers:

(1) Copolymer (1) E/GMA/MA = 66/7/27% by weight, MI = 17 g/10 min.
(2) Copolymer (2) E/GMA/MA = 70/9/21% by weight, MI = 19 g/10 min.
(3) Copolymer (3) E/GMA/MA = 68/2/30% by weight, MI = 6 g/10 min.
(4) Copolymer (4) E/GMA/EA = 66/7/27% by weight, MI = 8 g/10 min.
(5) Copolymer (5) E/GMA/MA = 75/0/25% by weight, MI = 37 g/10 min.

(C) Polyfunctional compounds:
(1) Compound (1) A copolymer of E/-DAM = 72/28% by weight and MI = 100 g/10 min. prepared by high-pressure radical polymerization.
(2) Compound (2) A copolymer of E/-DAM = 85/15% by weight and MI = 65 g/10 min. prepared by high-pressure radical polymerization.
(3) Compound (3) A copolymer of E/MAH/EA = 72/3/25% by weight and MI = 35 g/10 min. prepared by high-pressure radical polymerization.
(4) MB-1 A masterbatch prepared by melt-kneading 5 parts by weight of hexamethylenediamine carbamate and 95 parts by weight of ACRYFT®WH303 (Sumitomo Chemical Co., Ltd.) at 200° C. by a 30 mmφ single-screw extruder with a vent. (ACRYFT®WH303 is an ethylene copolymer of E/MMA = 82/18% by weight and MI = 7 g/10 min. prepared by high-pressure radical polymerization).
(5) MB-2 A masterbatch prepared by melt-kneading 5 parts by weight of isocyanuric acid and 95 parts by weight of ACRYFT®WH303 by the same method as in the above (4).

(D) Polyfunctional compounds:
(1) Compound (4) A copolymer of E/AA = 80/20% by weight and MI = 250 g/10 min. prepared by high-pressure radical polymerization.
(2) MB-3 A masterbatch prepared by melt-kneading 20 parts by weight of compound (4) and 80 parts by weight of ACRYFT®WH303 at 200° C. by a 30 mmφ single-screw extruder with a vent.
(3) MB-4 A masterbatch prepared by melt-kneading 5 parts by weight of adipic acid and 95 parts by weight of ACRYFT®WH303 by the same method as in the above (2).
(4) MB-5 A masterbatch prepared by melt-kneading 5 parts by weight of terephthalic acid and 95 parts by weight of ACRYFT®WH303 by the same method as in the above (2).
(5) MB-6 A masterbatch prepared by melt-kneading 5 parts by weight of 12-aminododecanoic acid and 95 parts by weight of ACRYFT®WH303 by the same method as in the above (2).

In the above, the abbreviations stand for the following:
E: Ethylene; GMA: Glycidyl methacrylate;
MA: Methyl acrylate; MAH: Maleic anhydride;
DAM: Dimethylaminoethyl methacrylate;
MMA: Methyl methacrylate; EA: Ethyl acrylate;
AA: Acrylic acid; MI: Melt index.

EXAMPLES 1-4

Saturated polyester resin and epoxy group-containing ethylene copolymer as shown in Table 1 were melt-kneaded at 240° C. by a 30 mmφ single-screw extruder with a vent to obtain resin compositions.

To these compositions were added polyfunctional compounds shown in Table 1 and each of the mixtures was again melt-kneaded at 240° C. by a 30 mmφ single-screw extruder with a vent to obtain elastomer compositions.

Each of the elastomer compositions was dried at 120° C. for 3 hours an therefrom a test piece for measurement of properties was prepared by a 10 oz injection molding machine (Toshiba IS-150-V) at a molding temperature of 250° C. and at a mold temperature of 80° C.

Heat distortion resistance, modulus in bending, tensile strength at break, elongation, Izod impact strength and oil resistance of the resulting test pieces are shown in Table 1.

COMPARATIVE EXAMPLES 1, 2 AND 4

Examples 1, 4 and 5 were repeated except that the polyfunctional compound (C) was not added and properties measured are shown in Table 1. The test pieces were low in stiffness, insufficient in impact resistance and poor in oil resistance.

COMPARATIVE EXAMPLE 3

Saturated polyester resin, epoxy group-containing ethylene copolymer and polyfunctional compound as shown in Table 1 were simultaneously melt-kneaded at one stage at 240° C. by a 30 mmφ single-screw extruder with a vent to obtain resin compositions. The compositions were evaluated in the same manner as in Example 1 and the results are shown in Table 1. They were insufficient in impact resistance and inferior in oil resistance.

EXAMPLES 5-15 AND COMPARATIVE EXAMPLE 5

Saturated polyester resin and epoxy group-containing ethylene copolymer as shown in Table 1 were melt-kneaded by a 30 mmφ twin-screw extruder having a side feed and a vent during which the polyfunctional compound as shown in Table 1 was added in a constant amount from the side feed provided halfway of barrel of the extruder and melt-kneaded to obtain elastomer compositions. These elastomer compositions were evaluated in the same manner as in Example 1 and the results are shown in Table 1.

COMPARATIVE EXAMPLE 6

Example 12 was repeated except that a copolymer containing no epoxy group was used as component (B).

TABLE 1

| | Composition | | | Heat distortion resistance 100° C. × 2 hr (mm) | Modulus in bending (Kg/cm$^2$) | Tensile properties | | Izod impact strength (Kgcm/cm) | Oil resistance in No. 3 oil 70° C. 22 hr (%) |
|---|---|---|---|---|---|---|---|---|---|
| | (A) (part by weight) | (B) (part by weight) | (C) (part by weight) | | | Strength at break (Kg/cm$^2$) | Elongation at break (%) | | |
| Example 1 | PBT(1) 45 | copolymer (1) 45 | compound (1) 10 | 6 | 3900 | 220 | 130 | NB | 15 |

TABLE 1-continued

| | (A) | (B) | (C)/(D) | Heat distortion resistance 100° C. × 2 hr (mm) | Modulus in bending (Kg/cm²) | Strength at break (Kg/cm²) | Elongation at break (%) | Izod impact strength (Kgcm/cm) | Oil resistance in No. 3 oil 70° C. 22 hr (%) |
|---|---|---|---|---|---|---|---|---|---|
| Example 2 | PBT (1) 45 | copolymer (1) 45 | MB-1 10 | 11 | 5900 | 230 | 140 | NB | 26 |
| Comparative Example 1 | PBT(1) 45 | copolymer (1) 55 | — | 105 | 1000 | 91 | 130 | 50 | Unmeasurable (dissolved) |
| Comparative Example 2 | PBT(1) 50 | copolymer (1) 50 | — | 90 | 2700 | 100 | 120 | 6 | Unmeasurable (dissolved) |
| Comparative Example 3 | PBT(1) 45 | copolymer (1) 45 | compound (1) 10 | 20 | 3800 | 180 | 80 | 20 | 45 |
| Example 3 | PBT(1) 45 | copolymer (2) 45 | compound (1) 10 | 8 | 3500 | 200 | 150 | NB | 28 |
| Comparative Example 4 | PBT(1) 50 | copolymer (2) 50 | — | 85 | 2800 | 110 | 130 | 8 | Unmeasurable (dissolved) |
| Example 4 | PBT(1) 43 | copolymer (1) 52 | compound (2) 5 | 13 | 4900 | 190 | 150 | NB | 19 |
| Example 5 | PBT(2) 45 | copolymer (1) 45 | compound (3) 10 | 12 | 5900 | 140 | 100 | NB | 18 |
| Example 6 | PBT(2) (1) 35 | copolymer 55 | MB-2 10 | 35 | 2500 | 130 | 175 | NB | 30 |

| | Composition | | | Heat distortion resistance 100° C. × 2 hr (mm) | Modulus in bending (Kg/cm²) | Tensile properties | | Izod impact strength (Kgcm/cm) | Oil resistance in No. 3 oil 70° C. 22 hr (%) |
| | (A) (part by weight) | (B) (part by weight) | (D) (part by weight) | | | Strength at break (Kg/cm²) | Elongation at break (%) | | |
|---|---|---|---|---|---|---|---|---|---|
| Example 7 | PBT(2) 45 | copolymer (1) 45 | MB-3 10 | 9 | 6400 | 188 | 175 | NB | 6 |
| Comparative Example 5 | PBT(2) 45 | copolymer (1) 45 | compound (4) 10 | Preparation was impossible due to excess reaction | | | | | |
| Example 8 | PBT(1) 35 | copolymer (1) 55 | MB-4 10 | 18 | 2700 | 149 | 175 | NB | 33 |
| Example 9 | PBT(2) 45 | copolymer (1) 45 | MB-4 10 | 10 | 4900 | 191 | 250 | NB | 11 |
| Example 10 | PBT(2) 35 | copolymer (1) 55 | MB-5 10 | 21 | 1700 | 139 | 175 | NB | 34 |
| Example 11 | PBT(2) 35 | copolymer (1) 55 | MB-6 10 | 15 | 3300 | 160 | 175 | NB | 20 |
| Example 12 | PBT(2) 35 | copolymer (2) 55 | MB-4 10 | 22 | 1900 | 165 | 150 | NB | 41 |
| Example 13 | PBT(2) 35 | copolymer (3) 55 | MB-4 10 | 13 | 2500 | 141 | 200 | MB | 17 |
| Example 14 | PBT(2) 35 | copolymer (4) 55 | MB-4 10 | 12 | 3700 | 173 | 200 | NB | 27 |
| Comparative Example 6 | PBT(2) 35 | copolymer (5) 55 | MB-4 10 | Unmeasurable | 2800 | 96 | 100 | NB | Unmeasurable (dissolved) |
| Example 15 | PET 45 | copolymer (1) 45 | MB-4 10 | 35 | 5000 | 175 | 175 | NB | 18 |

As explained above, the thermoplastic elastomer composition obtained by the method of the present invention provides very good balance in properties of molded articles such as mechanical properties and thermal properties and besides provides molded articles of good appearance.

Especially, addition of the polyfunctional compounds (C) or (D) can improve stiffness and heat distortion resistance without damaging impact resistance. This is an unexpectable effect.

The novel flexible elastomer composition provided by the present invention can be easily processed into molded articles and sheets by processing methods ordinarily used for general polyester elastomers such as injection molding and extrusion molding and the thus obtained articles are extremely good in balance of properties such as heat resistance, wear resistance, flexibility, impact resistance and chemical resistance and have superior appearance and surface smoothness.

We claim:

1. A method for producing a thermoplastic elastomer composition having a modulus in bending of 500–15,000 kg/cm² which comprises melt-kneading (A) 20–50 parts by weight of polybutylene terephthalate consisting of a terephthalic acid component and a 1,4-butane diol component and (B) 50–80 parts by weight of an epoxy group-containing ethylene copolymer comprising (a) 50–99% by weight of an ethylene unit, (b) 0.1–50% by weight of an α,β-unsaturated carboxylic acid glycidyl ester unit or an unsaturated glycidyl ether unit and (c) 0–50% by weight of an ethylenically unsaturated compound unit and then melt-kneading 100 parts by weight of the resulting composition with (C) 0.01–20 parts by weight of a polyfunctional compound containing in one molecule at least two functional groups which may be identical or different and which are selected from the group consisting of an amino group, a carboxylic anhydride group, a hydroxyl group and a

group wherein both X and Y are oxygen atoms or sulfur atoms or either X or Y is an oxygen atom and another is a sulfur atom with the proviso that when the polyfunctional compound (C) is a heterocyclic compound it contains a

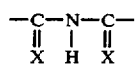

group.

2. A method according to claim 1, wherein the polyfunctional compound, the component (C), is an aliphatic diamine carbamate.

3. A method according to claim 1, wherein the polyfunctional compound, the component (C), is an ethylene copolymer comprising an ethylene unit and an α,β-unsaturated carboxylic acid N,N-dialkylaminoalkyl ester unit or an ethylene copolymer comprising an ethylene unit and an α,β-unsaturated carboxylic acid N,N-dialkylaminoalkylamide unit.

4. A method according to claim 1, wherein the polyfunctional compound, the component (C), is an ethylene copolymer comprising an ethylene unit, an α,β-unsaturated carboxylic acid alkyl ester unit and a maleic anhydride unit.